(12) United States Patent
King (10) Patent No.: US 7,159,367 B1
(45) Date of Patent: Jan. 9, 2007

(54) SIMULATED MASONRY GARDEN WALLS HAVING MODULAR CONSTRUCTION

(76) Inventor: John King, 39 Hopyard Rd., East Haddam, CT (US) 06423

( * ) Notice: Subject to any disclaimer, the term of this patent is extended or adjusted under 35 U.S.C. 154(b) by 528 days.

(21) Appl. No.: 10/623,056

(22) Filed: Jul. 16, 2003

Related U.S. Application Data (63) Continuation-in-part of application No. 10/213,832, filed on Aug. 6, 2002, now Pat. No. 6,944,998.

(60) Provisional application No. 60/310,063, filed on Aug. 6, 2001.

(51) Int. Cl.
*B44F 9/04* (2006.01)
*A01G 1/08* (2006.01)

(52) U.S. Cl. .................... 52/314; 52/102; 52/604; 52/585.1; 47/33

(58) Field of Classification Search ............ 52/102, 52/314, 585.1, 604; 47/33
See application file for complete search history.

(56) References Cited

U.S. PATENT DOCUMENTS

| | | | |
|---|---|---|---|
| 348,598 A | 9/1886 | Strickland | |
| 3,762,113 A | 10/1973 | O'Mullan | |
| 4,275,540 A * | 6/1981 | Keller | 52/314 |
| 4,869,018 A | 9/1989 | Scales | |
| 5,080,523 A | 1/1992 | Steiner | |
| 5,119,587 A | 6/1992 | Waltz | |
| 5,168,678 A * | 12/1992 | Scott et al. | 52/102 |
| D338,377 S * | 8/1993 | Scott et al. | D8/1 |
| D338,812 S * | 8/1993 | Scott et al. | D8/1 |
| D343,509 S * | 1/1994 | Scott et al. | D8/1 |
| D346,726 S * | 5/1994 | Scott et al. | D8/1 |
| D371,446 S | 7/1996 | Van Deusen | |
| D372,991 S * | 8/1996 | Ramsey | D25/164 |
| 5,675,930 A | 10/1997 | Cooper | |
| 5,806,249 A * | 9/1998 | Helms | 52/102 |
| D402,380 S | 12/1998 | Komorski | |
| 5,921,021 A | 7/1999 | Coates | |
| D448,859 S | 10/2001 | Doman | |
| D449,387 S * | 10/2001 | Dumbleton | D25/108 |
| 6,418,675 B1 | 7/2002 | Peggs | |
| 6,854,221 B1 * | 2/2005 | Michaels | 52/102 |
| 6,944,998 B1 * | 9/2005 | King | 52/314 |

* cited by examiner

*Primary Examiner*—Robert Canfield
(74) *Attorney, Agent, or Firm*—C. Nessler (57) ABSTRACT

A simulated masonry module, made of blow molded plastic, has a hollow box-like body with a heavily textured front and top. Modules are pin-connected to each other at interleaving ends, which preferably comprise a slot mortise and tenon which fit closely, so that rotation about the pin is prevented. Modules may be stacked, to form assemblies simulating a masonry wall, and to form an enclosure suited to contain soil or water in a tub-like liner. Sand or other material may be put inside the modules through a rear access port, to add mass and stability. The bottom of a module has sculpting, to loosely fit and interlock with the contour of the top of a like-module, when modules are stacked, so the horizontal joint is unobtrusive. A spike, used for connecting module ends, is retained in a shaped groove on the rear of the module, to enable convenient shipment of a module and spike combination.

22 Claims, 10 Drawing Sheets

SIMULATED MASONRY GARDEN WALLS HAVING MODULAR CONSTRUCTION

This application is a continuation in part of patent application Ser. No. 10/213,832, filed Aug. 6, 2002 now U.S. Pat. No. 6,944,998; and it claims benefit of provisional patent application Ser. No. 60/310,063, filed Aug. 6, 2001.

TECHNICAL FIELD

The present invention relates to simulated masonry articles; in particular, articles made of plastic or other non-ceramic material, which in appearance seem to be portions of stone or brick walls, for use in decorative gardens.

BACKGROUND

Masonry objects, that is, things comprised of stone or brick have long been used in natural and artificial gardens for esthetic and functional purposes. For instance, masonry walls are used to define boundaries and retain earth. Typically, good construction requires some sort of foundation, particularly when the ground alternately freezes and thaws. In any case, masonry structures are inherently heavy and need to have adequate structural support.

Simulated masonry articles in general are known. For instance, they are used when gardens are placed within a building, where the weight of masonry walls and other objects is undesirable from the standpoint of the structure. Similarly, it is desirable to have light weight objects when portability, easy placement or easy rearrangement of the units is an aim. In the past, simulated masonry articles have been made of such as painted wood, plaster, and plastic resins, etc. Simulated rocks, which are hollow and are made of molded plastic resin, have been known for decorative purposes, for use in exterior and interior locations.

Modular garden wall systems are known. For instance: U.S. Pat. No. 5,080,523 to Steiner describes a modular concrete wall system. U.S. Pat. No. 348,598 to Strickland shows curved concrete modules. U.S. Pat. No. 3,762,113 to O'Mullan shows molded plastic edging. U.S. Pat. No. 4,275,540 shows a modular plastic four-high brick wall, with open rear sides which can be closed with a panel. The interlocking stepped ends of the modules are held together by pins, which optionally extend into the earth. Filler blocks are used to make vertical plane ends.

The modular garden wall systems in the prior art have various advantages and disadvantages. Some are obviously heavy. While they are stable, they are difficult to transport, move about, and store. On the other hand, simulated masonry, which is so light that it does not stay in place, can fail to achieve more than a simple cosmetic effect. Simulated masonry often fails to be good looking and sufficiently simulative of ordinary masonry. Other prior art designs are expensive to fabricate. Still others have means for connecting which does not well combine well, simplicity, appearance of the joint, and ease of assembly or disassembly. Thus, there is a need for improvements.

SUMMARY

An object of the present invention is to provide a three dimensional realistic looking wall which simulates the appearance of a masonry wall; and which can be assembled from modules. An object is to have a kit with which to construct a wall which is straight, angled or curved, or formed into an enclosure to contain soil or water, according to what a user desires.

Another object is to provide means for interconnecting modular modules and for keeping them in place against lateral forces. Another object is to provide a simulated the wall which is durable—resistant to mechanical and weather damage, and to provide a wall which is strong but light enough to be assembled, disassembled, and moved about manually by an ordinary person. Another further object is to provide good-looking wall modules that are suited for manufacture on a production basis.

In accord with the invention, a simulated masonry wall module is comprised of a box-like body having a front side which is textured, preferably also a top side which is textured, ends which join together with like modules in horizontal interleave fashion, and means for pinning the mated modules. Preferred interleaving ends are alternatively slot mortise and tenon, or simple overlap of cantilever end segments. Preferably, the slot mortise and tenon have rectanguloid shapes and closely fitted dimensions, so that when a straight or right angle joint is formed between modules, there will be no rotation at the joint. Preferred means for pinning together mated modules comprises a pin passed through holes in the ends, and when appropriate into the ground supporting the modules. Alternative means for pinning comprises an embossed point for penetration by a pin, or a male molded projection, which engages a female depression of the opposing end of a mating module. When desired, filler blocks, which mate with the ends, are used to form essentially vertical or square ends.

In accord with the invention, when modules are stacked in layers, for instance to form a two-module high wall, the ends are vertically aligned and pins run through the stacked modules, preferably into the underlying support material. Preferably, the top and front of the module are highly textured to simulate a wall, such as laid up quarry stone; and, the bottom side of a module is sculpted in a mirror image of the top, so it loosely fits the texture or contour of the top. Thus, when units are stacked, the horizontal joint is unobtrusive. An alternate embodiment module has a separate cap, which attaches to a plain surface top. Preferably, the cap extends laterally from the front and back.

Modules may be straight, curved or angled, and they are connectable end to end to form segments of walls or enclosures. Preferred modules have depressions on the upper end of the rear, so a liner contained in an enclosure may be fastened in place. To make shipping easier, preferred modules have a groove in the rear side, which is shaped to receive and retain a pin used to connect the units, so the pin is substantially beneath the plane of the rear surface.

Preferred modules have an opening in the rear, so that sand, gravel or other material may be placed inside the modules to increase their mass and stability. Other optional features, which aid stability, include a flange extending off the rear and vertical fins on the underside. Optionally, nubs with vertical holes are attached to the rear side of a module to receive vertical shafts and the like, such as a flagstaff or trellis bottom.

Articles of the invention may simulate the look, and in differing degrees the function, of walls made of stone or brick, when put in use, for example, in a natural or artificial garden. Preferably the articles are made of molded plastic resin such as blow molded high density polyethylene.

In accord with the invention, a module having a tenon and slot mortise type joint is made blow molded in a uniquely configured mold which avoids disruption of the texture of simulated stone which could result from a conventional mold parting line and associated flashing. A preferred module of the invention is made in a mold which produces two lengthwise parting lines, one running along the front bottom edge; the second running along the top rear edge. Those parting lines are connected by a winged N shape parting line at the mortise end, a simple zig-zag shape parting line at the tenon end, and a L shape parting line between.

The foregoing and other objects, features and advantages of the present invention will become more apparent from the following description of preferred embodiments and accompanying drawings.

DESCRIPTION

Some of the matter described herein was previously disclosed in provisional patent application Ser. No. 60/310,063, filed Aug. 6, 2001, and in patent application Ser. No. 10/213,832, filed Aug. 6, 2002 and now abandoned, the descriptions and drawings of which are hereby incorporated by reference.

Figure 13:
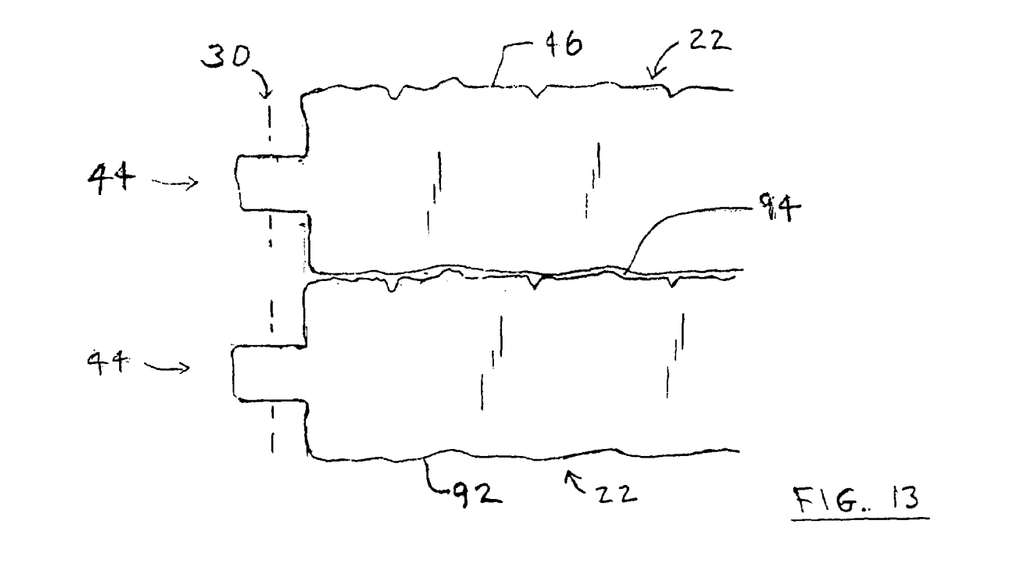
FIG. 13 is a simplified vertical elevation view of the a portion of two stacked modules, showing how the ends align and how the depressions on the bottom interact with the contours on the top of the module.
Figure 14:
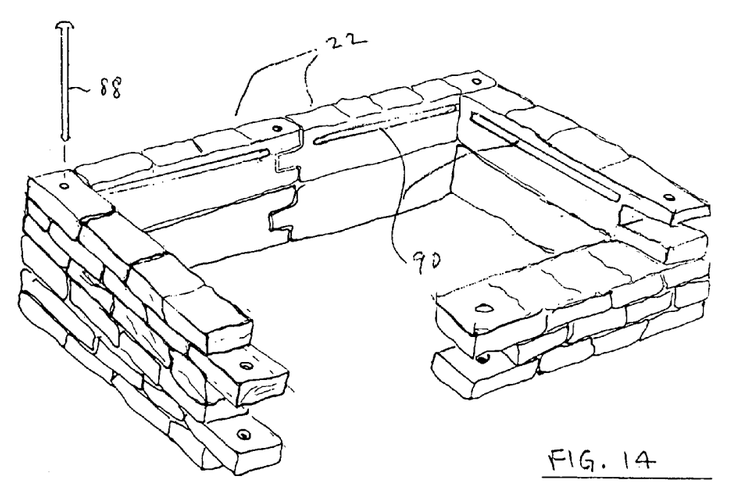
FIG. 14 shows how modules may be interconnected and stacked two-high, to form a rectangular enclosure.

In the invention, walls are formed from modular straight or curved elements—called modules or modules hereafter. The modules may be sold as kits and can be interconnected to make assemblies which may be enclosures or free end structures. The modules may be straight, curved or angled. In different embodiments, modules interconnect in different ways. The modules may be connected as a single row. One row may be stacked on another, as shown in FIGS. 13 and 14. The structures may be used in various ways, such as for free standing decorative units, for dividing a plot, or for forming an enclosure holding a container of water, as a pond.

The modules are nominally rectanguloid cross section hollow structures and therefore they are referred to as being box-like. Modules are preferably made of blow molded high density polyethylene with a nominal 0.12 to 0.25 inch wall thickness. Alternately, fiberglass-polyurethane, and other commercial polymers or polymer composites may be used. Other non-masonry materials may be considered, such as paper products, and molded wood. Commercial plastic blow-molding fabrication technology is used to form the components that are described here.

Figure 1:
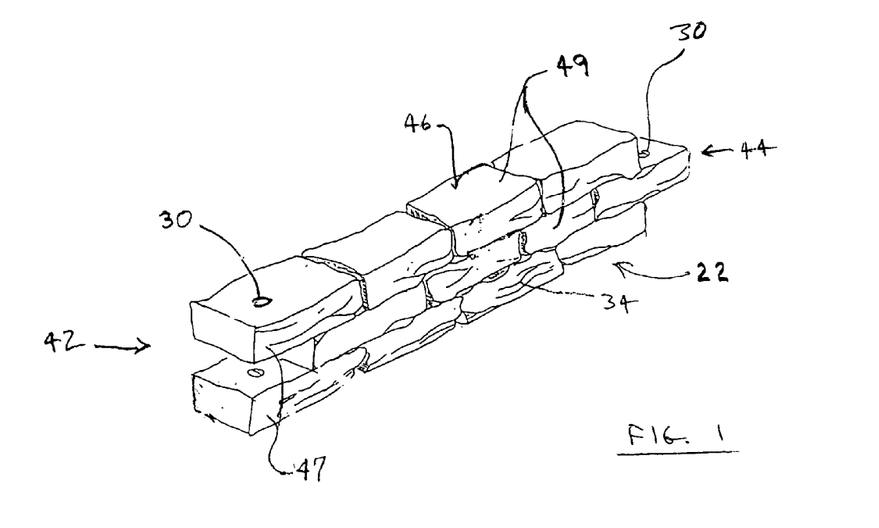
FIG. 1 is an isometric view of the front of a module which simulates a masonry wall. The module connects at tenon and slot mortise ends with like modules or other components to form an assembly.
Figure 2:
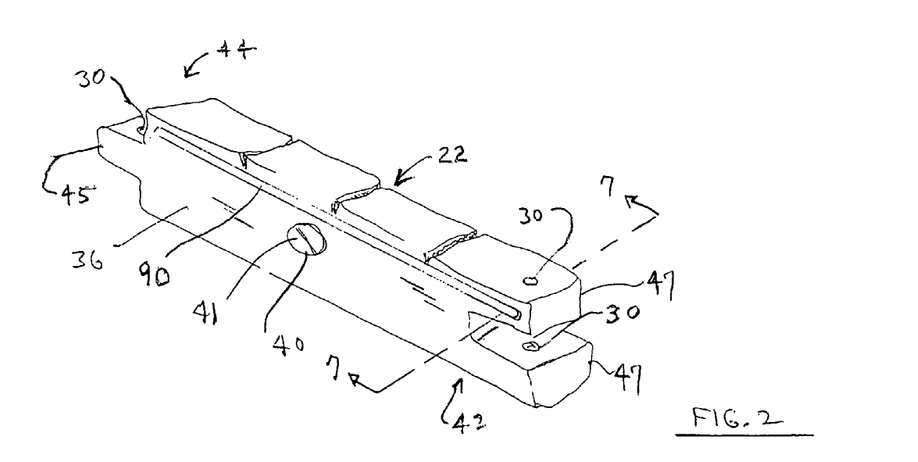
FIG. 2 is an isometric and simplified view of the rear of the FIG. 1 module.

FIG. 1 is an isometric view of a typical article or module 22 from the front. FIG. 2 shows the same unit from the rear. In the exemplary module of FIG. 1, the front side 34, which runs along the length of unit, and the top side 46, are sculpted artistically to simulate the appearance of a natural laid quarry stone wall. There is a texture to the top and front. As used herein, the term texture comprehends or includes that a surface will also have a contour, that is, the term includes coarse as well as fine variations in the surface. The relief of the sculpting or texture is typically one quarter to one inch. The vertical end surfaces have lesser sculpting, owing to limitations of the manufacturing method. The faces either have integral coloring or are painted to simulate the color of stone. Other masonry, such as rubble stone and brick may be simulated. Surfaces which are not finished are called plain surfaces.

The exemplary unit 22 shown in FIG. 1 is about 48 inch in overall length, about 10 inch high, and about 6 inch depth. It has three courses, or horizontal layers, of simulated stones 49 laid with mortar. More or less courses of stone may be simulated. Of course, different dimensions of units may be used, alone or in mixed fashion. Masonry simulation appearances other than those described in the examples may be used, for example rubble stone and brick. At least the front 34 of the unit is textured. Usually, the top 46 is textured, as shown in FIG. 1. The rear side 36 will typically not be textured, simply for reasons of economics, primarily relating to finishing. The bottom surface may be plain or textured. It is discussed further below. Ribbing or other unevenness may be employed, albeit infrequently, on the rear side, and on the interior module surfaces, to impart strength to the walls of the modules.

With reference to FIG. 1 and FIG. 2, the module 22 has a female end 42 and a male end 44, so like units can be joined together to form an assembly which is an essentially continuous wall, which means that in fit and visual appearance it will seem to a casual observer that the wall does not have joints. The casual observer will not quickly see the places where the ends engage or where one layer of modules overlies another layer.

Different mating end shapes may be used, within the object of having horizontal overlap between a portion of one module and the connecting module. In the module 22 shown in FIG. 1 and FIG. 2, male end 44 comprises a tenon 45, which runs laterally or horizontally transverse to the module length. It is shaped to fit into the recess 28 of the two halves 47 of the slot mortise which comprise the female end 42 of a like, or identical, module. The vertical thickness of the tenon and two slot mortise portions corresponds with the grooves that define the simulated stone layers of the front face, or the mortar joints of brick simulation, etc.

Figures 3, 4, 5, 6:
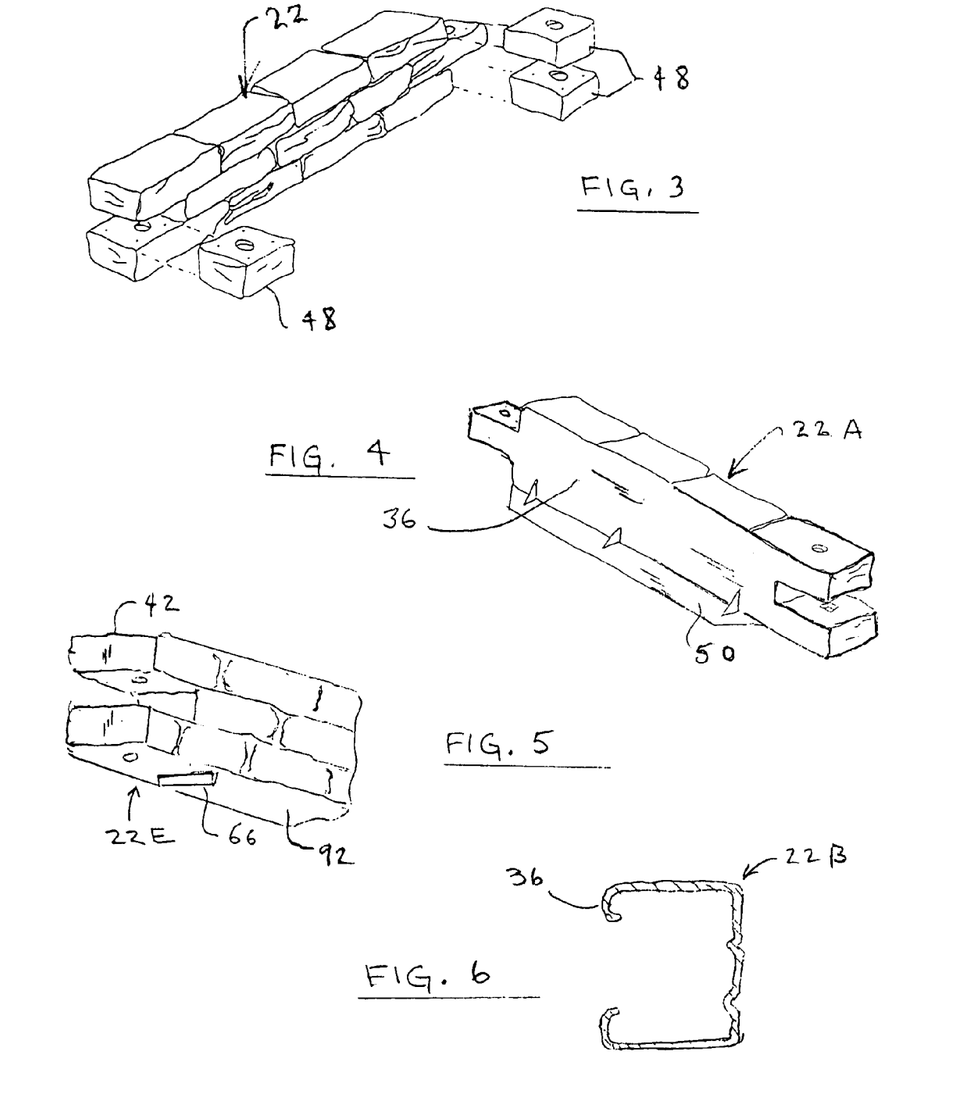
FIG. 3 shows how filler blocks engage a module to construct an assembly with square ends.
FIG. 4 shows the rear side of a module having a flange extending laterally from the bottom.
FIG. 5 shows a portion of the end and underside of a module having a transverse fin or rib on the underside.
FIG. 6 shows the cross section of a module with a substantially open rear side.
Figure 12:
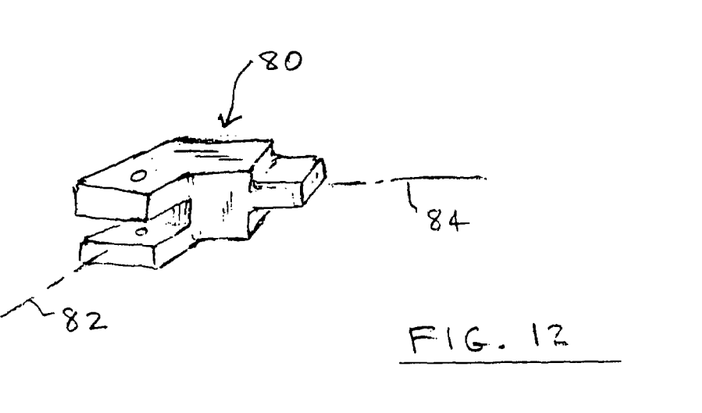
FIG. 12 shows an angle coupling, which is a short module having non-parallel ends.
Figure 15:
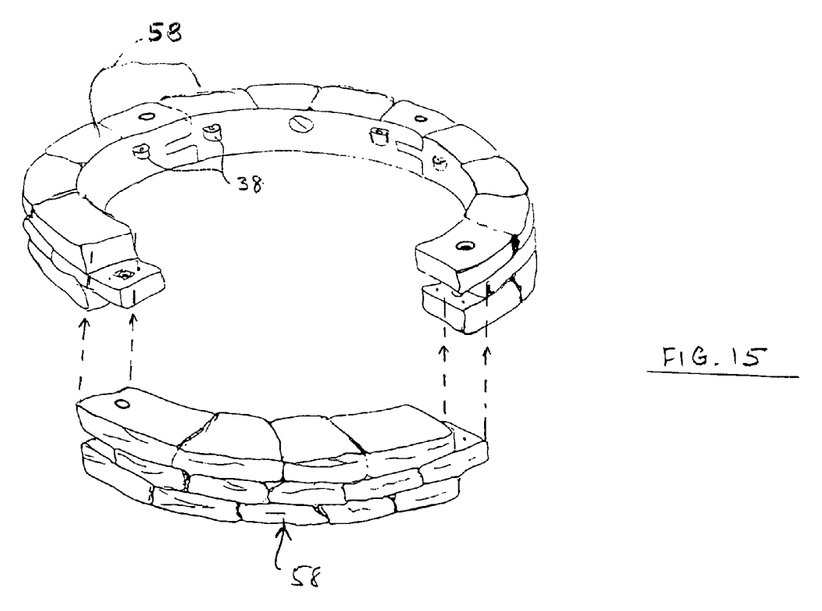
FIG. 15 shows curved modules connected to form a circle, where the modules have nubs on the rear side.

The terminal ends of one module, or of the end of a string of such tenon and slot mortise end modules, can be made to have a squared off appearance by inserting filler blocks 48, as shown in FIG. 3. The filler blocks have material and construction similar to the modules. Filler blocks may also be used with an alternative end configuration, shown in FIGS. 17A and 17B. With the ends and connections shown herein, modules may be assembled to form a straight run wall of indefinite length; or to form a rectangular enclosure as shown in FIG. 14. Curved modules 58 may be made, and connected to form a circle 48, as shown in FIG. 15. Straight and curved units may be connected, for instance to make a D-shape enclosure, not shown. For sharp angles between modules, an angle coupling 80, as shown in FIG. 12 is used. Coupling 80 is simply a short module, where the longitudinal axes 82, 84 of the opposing module ends are not parallel. The angle between axes is chosen according to the need. For instance, the angle is 72 degrees if a pentagon were to be constructed.

Figure 11:
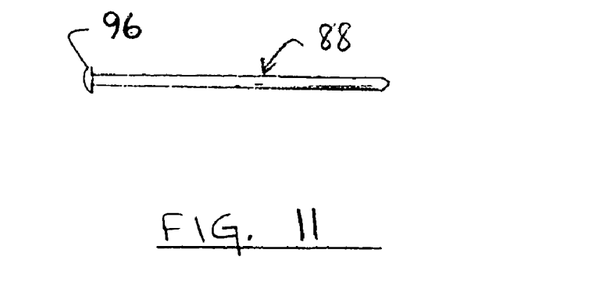
FIG. 11 shows a spike which is used for pinning module together.

The ends 42, 44 of module 22 have vertical holes 30, so that when the modules are mated, pin fasteners, such as spike 88, may be run vertically down through the holes, to hold modules together. See FIG. 14. Preferably, the fastener is a button head steel boat spike 88, as shown in FIG. 11. When the material underlying a module permits, one or more of the fasteners optionally penetrate vertically into the material—such as soil, sand, or wood, to thereby hold a module(s) in place. The length of the fastener is chosen according to what is desired in this respect, and according to how many modules are stacked.

A preferred embodiment module provides a particularly good fit between the mortise and tenon in two respects. First, the horizontal length the tenon is such that it fully fills the depth of the slot of the mortise. Thus, when two modules are mated, there is interference between the base of the slot bottom and end of the tenon, sufficient to prevent significant horizontal plane rotational, or bending of the assembly. (Conversely, when a bendable wall is desired in a different embodiment, some clearance is allowed, or a curved end mortise and tenon are used.) Second, preferably, the front-back width of the tenon is the same as the length of the tenon. That is, it is square when viewed from the top, and the hole 30 is in the middle of the square. Thus, when modules are joined and fastened so they run at 90 degree angles, they will like wise be "locked in position" by interference fit of the rear face of the tenon with the bottom of the mortise slot. The features here will be applicable to the module of FIGS. 17A and 17B and other variations of modules.

FIG. 4 shows a module 22A having a lateral flange 50 with three gussets, extending rearwardly from the lower end of rear side 36. Thus, earth or other objects can be placed on the flange, to hold the unit in place. The flange will also serve to inhibit the extent to which erosion and washing of soil under the wall will take place. Ribs or fins extending vertically down from the bottom may be employed for holding units in place when they are mounted on penetrable material, such as soft soil. FIG. 5 shows a fin 66 running transversely on module 22E. Alternately, bottom fins can run lengthwise.

Preferably, the end to end fit between tenon and slot mortise of mating units is tight, as is the fit of the pin in the module. Thus, no more than a few degrees of rotational movement is possible at the connection, since there is interference fit between the terminal vertical surfaces of the mating parts of the ends. In another embodiment, the fits may be loosened to permit a greater degree of angling between units, but not so much as to make the vertical joint prominent.

Figure 7A:
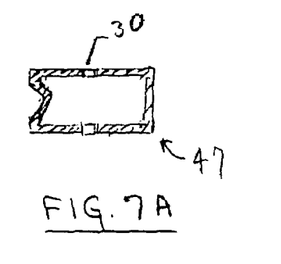
FIGS. 7A, 7B and 7C show alternate constructions for means for pinning of the end of a module.
Figure 7B:
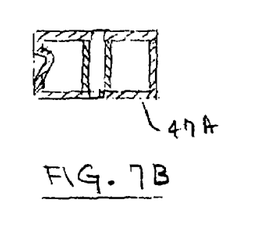
Figure 7C:
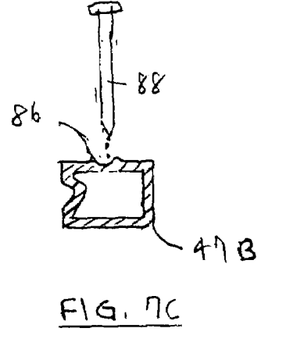

FIGS. 7A, 7B and 7C show, through example of a cross section portion of the slot mortise, how the module end has means for pinning, for use of a pin, such as a spike. Typically, a simple hole is drilled in the unit, as illustrated for slot mortise portion 47 in FIG. 10A. An appropriate sealant may be used around the fastener where it penetrates the module. Alternately, there may be a sleeve running between the upper and lower surfaces of the section of module through which the pin passes, to resist distortion in the event of excessive downward force on the pin, or to provide better sealing, as in FIG. 7B. Alternately, an installer user may drive the pin or other fastener, such as a screw, through the thickness of the top surface of a module at a point where there is embossing 86, such as a pocket or a ring, on the module, as indicated for slot mortise part 47A in FIG. 7C. The means for pinning includes ends as just described. It may also include a pin itself.

Figure 8:
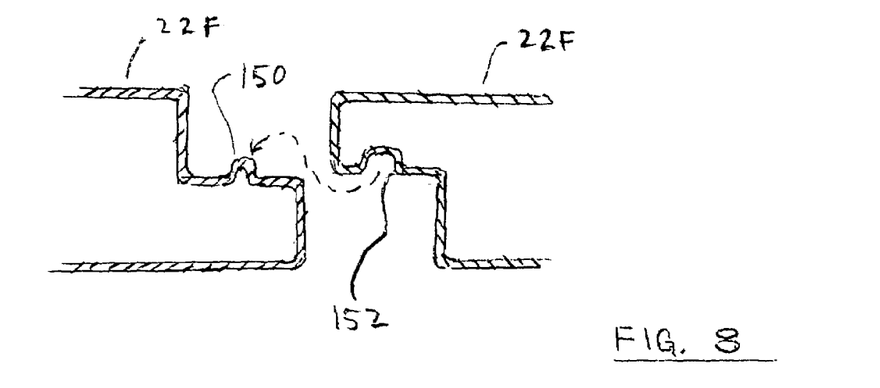
FIG. 8 shows another alternative means for pinning the end of a module, which means are molded into the plastic surface of a module end.

Other pinning means may be used. For instance, FIG. 8 shows a module having an alternative simple overlap end configuration, discussed further below in connection with FIG. 17. The means for pinning, shown in FIG. 8, comprises a molded plastic projection 150 on the male function end. It is received in a cavity 152 on the underside of female function second end of a like module, as indicated by the dashed arrow. Other fasteners and constructions, which function as means for pinning in preventing longitudinal and lateral motion, may be used at the ends may be used within the generality of the invention. Modules may also be pinned to the supporting surface and each other by other fasteners, at or away from the ends, as desired.

The preferred plastic modules are light in weight for portability and cost. Module 22 has one or more removable access holes 40 which are fitted with removable plugs 41, on the rear face 36. See FIG. 2 and FIG. 10. Openings 40 provide access to the interiors of the units, so that sand, gravel, water (when the units are water tight) and other material may be placed inside the units to give them greater mass and make them more stable when resting in place. The access openings may be made larger than suggested by the Figure, to enable a person's hand to fit inside the units, so they may be bolted together. Alternately, the rear side is made substantially open, as shown by the cross section of module 22B, in FIG. 6.

Figure 9:
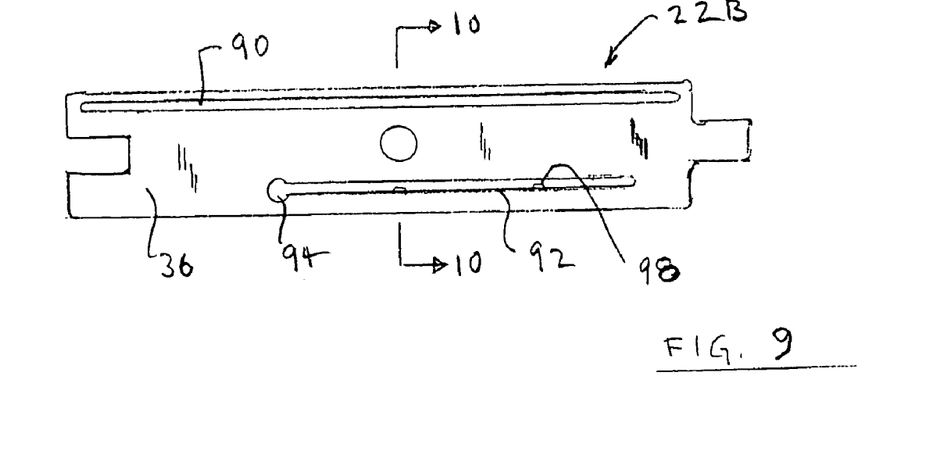
FIG. 9 shows the rear side of a module, to illustrate two different kinds of depression or groove, one of which receives a spike for shipment
Figure 10:
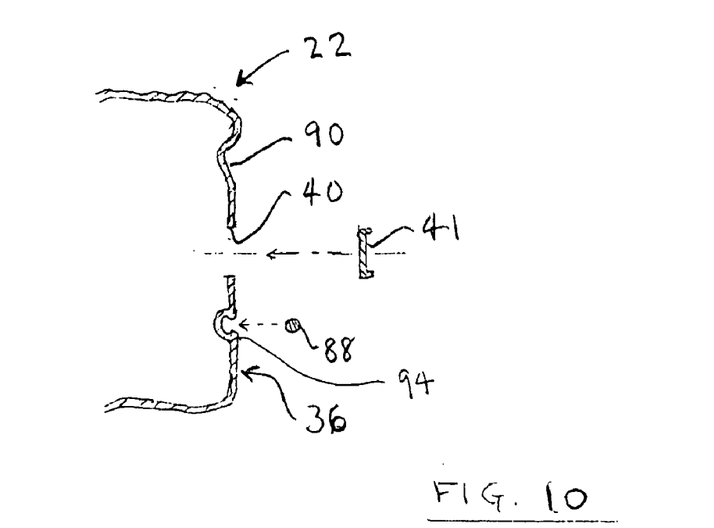
FIG. 10 is a cross section through the module shown in FIG. 9.

FIG. 9 and FIG. 10 show the rear side 36 of module 22. Two useful features (not shown in FIG. 2 for clarity there) are present. The first is lengthwise depression 90 near the top of the rear side. The depression receives double sided adhesive tape or other fastening means when a tub like liner is used, as described below. The second feature is a lengthwise depression, groove 92, near the bottom of the rear side. It receives and retains boat spike 88 during shipment of the module. Preferably, groove 92 has a first width portion, to accommodate the major shank part of the spike; and, there is a wider width slot end portion 94, to receive the head 96 of the boat spike or like headed fastener, shown in FIG. 11.

In one mode, as shown, there are two or more projections 98 on the bottom side of the groove 92. The groove has more concavity at its top surface than at its bottom. Thus, when a spike is pressed into the groove, the plastic of the module elastically deforms and springs back, so the spike is retained in the groove. An installer removes the spike by pulling or prying at the time of assembly of modules. The groove is shaped so that the shank part, at least, is substantially below the adjacent surface of the rear side; and, only a little or none of the head will project above the adjacent surface. Thus, the dimension of any shipping package is essentially the same as for the plain module, and need for separate and bulky spike-packaging is avoided. In another embodiment, the slots do not have projections 98 and the spike rests in the groove, with retention provided by means such as the closely fitting wall of shipping container, an adjacent module, tape adhered to the rear surface of the module, or a band running around the module.

FIG. 14 shows a partially constructed rectangular enclosure and illustrated how modules 22 may be stacked, at least two-high. In some instances, units might be stacked even higher. Spikes 88 pass through the ends of the stacked modules, optionally into the supporting surface. FIG. 14 and the fragmentary elevation view of FIG. 13 emphasize how the units stack, with the ends of an upper layer module in alignment with the end of the module of the underlying layer. This is different from a conventional way of stacking such kinds of things, wherein end joints are offset, layer to layer. An upper layer of units may be further screwed, bolted or adhesively attached to the under-layer.

Preferably, the bottom side 92 of module 22 has a sculpting which is loosely shaped to be the female impression of the top side, so it is an approximate mirror shape of the top. FIG. 13 illustrates the kind of mirror impression and fit obtained at the joint 94. It is better than the fit which is obtained when the bottom is flat or contoured without respect to the top side texture/contour. The space or air gap of joint 94 between the units is thus lessened so that there is unobtrusive visual impression of the joint between the units and improved stability to the assembly. When there is a loosely shaped mirror impression, then with gentle horizontal plane motion of the top unit by the installer, there will be found a location where the top unit engages or interlocks with the underlying unit, thus providing a reduced or minimum height to the assembly. Of course, a more precise mirror of the top surface could be alternatively be imparted to the bottom, although that would raise cost, and would not accommodate small particles of debris so well. In the generality of the invention, the bottom can be plain.

Figure 16:
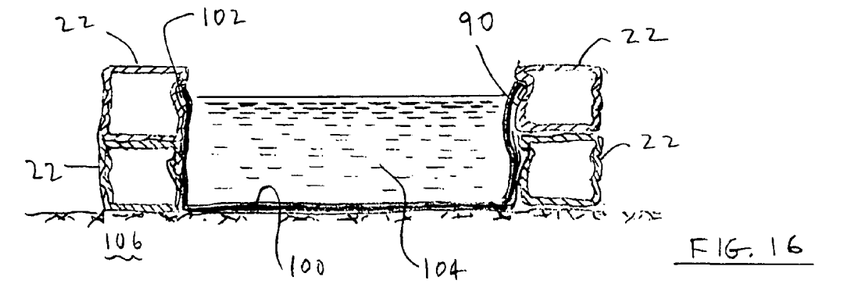
FIG. 16 is a vertical cross section through an enclosure containing a liner filled with water.

FIG. 14 illustrates how depressions 90 on the rear side of each unit cooperate, to form a nearly continuous lengthwise depression running preponderantly around the top of the interior of an enclosure. FIG. 16 shows a vertical cross section of a rectangular, square, round, etc., enclosure like that shown in FIG. 14, resting on soil 106. The aligned depressions 90 receive the upper ends of a tub shape liner 100 of water tight material, such as common plastic sheeting or a specially molded unit, positioned within the enclosure and is substantially filled with water 104. Double-sided adhesive tape 106 preferably holds the liner in the depression, creating a neat appearance. Alternately, screws and trims strip may be used.

Figure 17A:
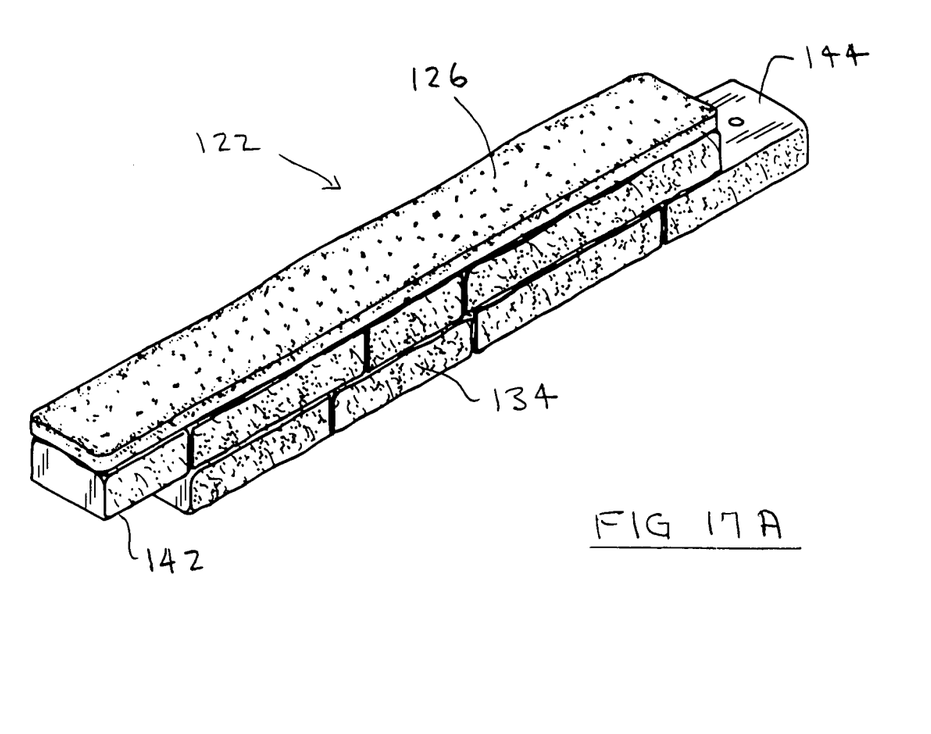
FIG. 17A is an isometric view of a module having simple overlap ends and a relatively untextured top.

FIG. 17A shows alternate embodiment module 122. Features which correspond with the FIGS. 1 and 2 module are designated with a prefix "1". The horizontal cantilever ends 142, 144 extend from the body, so like modules may mate in simple overlap fashion. As shown, end 142 is thicker than end 144; in other embodiments they may be the same thickness. When like-modules are joined, the fit between the segments comprises a joint with means for pinning 130, similar to that previously described. The ends in FIG. 17 may used on the module with textured top and front, as shown in FIG. 1. Module 122 is shown with a top simulative of a flat stone. Alternately, the top is like that described for module 22; and the bottom will be sculpted as previously described. (In another alternative, module 22 may have a flat top.)

Figure 17B:
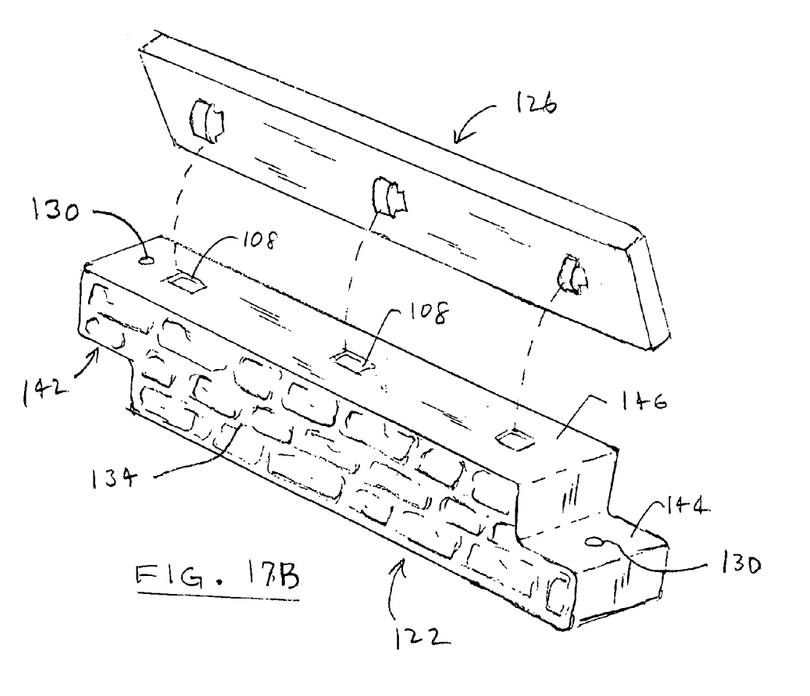
FIG. 17B is an isometric view of a module having a removable cap and simple overlap ends.

FIG. 17B shows an alternate embodiment of the FIG. 17A module, where, module 122A has a plain top and a cap 124 which attaches to the top. The top side 146 of the module is flat and plain; and, it has a multiplicity of holes or pockets 108, shaped to receive the projections 110 which extend downwardly from the separately formed cap. In FIG. 17B, the projections are arrowhead shape tabs which will snap into place within the cutout holes 108. When installed, the cap may have a top surface which is simulative of a flat stone, for instance, and the front and back edges extend beyond the nominal vertical planes of the front and back sides of the lower portion of the assembly, i.e., the front side 134 and rear side 136. A detachable cap, flat or textured, may also be applied to the module 22 of FIGS. 1 and 2.

Other features may be employed on modules. FIG. 15 shows nubs 38 with vertical through-holes, which may extend from the rear side of any configuration module. The nubs may receive further pins which pass vertically into the earth. Or, they may receive the end of a flagstaff, or the lower vertical portions of legs of a trellis, and so forth.

While different methods can be used to form a module, as mentioned above, the preferred way is to use blow molding. In the process, a parison of heated thermoplastic, for instance high density polyethylene, is expanded within the closed cavity of a mold. Then, air and or steam is injected into the interior of the parison, to thereby expand the plastic outwardly so it conforms with the walls of the mold, whereupon it is cooled sufficiently so that the mold, typically opposing halves, may be opened and the part removed.

After removal from the mold, a typical first finishing steps entails removal of the characteristic parting line flashing which forms due to a small gap or mis-match where the mold parts mate. Often, flashing removal is manual. Removal of flashing can result in variability. However done, there is an appearance discontinuity where the flashing was, and often the adjacent detail is removed with the flashing. Of course, that is unwanted in the present invention, where good simulation is desired. Commonly, blow molds comprise symmetrical concave halves split on a lengthwise center plane, as for instance, molds for making bottles. Mold design and the location of parting lines for asymmetrical and highly contoured parts are more problematic. That is the case for the representative modules shown in FIG. 1 or 17A.

With respect to the module 22 of FIG. 1, there must be accommodated the virtual undercut and high texture of the simulated masonry on the front 34 and top 46, along with slot mortise at one end and the tenon at the other end. The bottom 42 of the module also has a somewhat dimensionally critical surface, being contoured to approximate the major features of the top.

Figure 18:
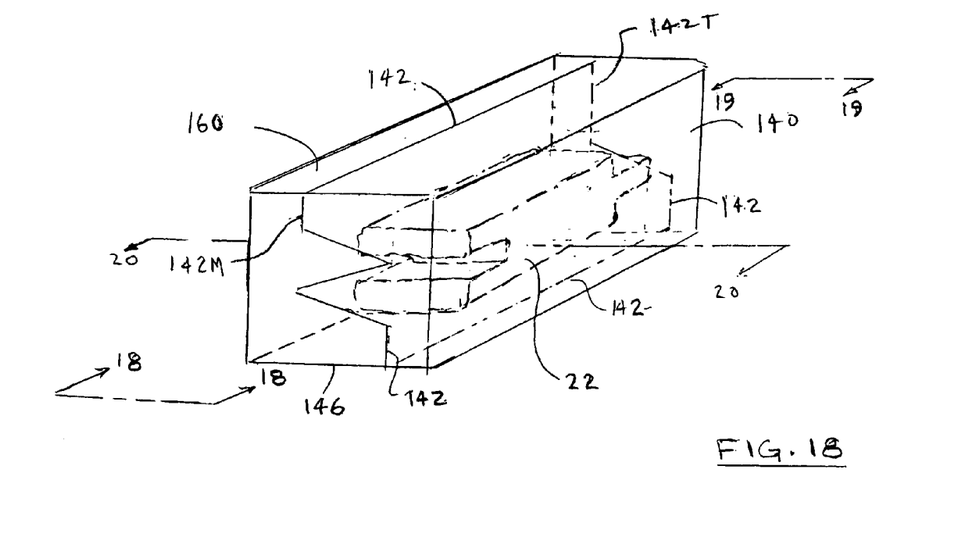
FIG. 18 is a isometric and schematic view of an assembly comprising a FIG. 1 module contained within a mold or die, within which it is formed.

FIGS. 18–21 illustrate how the mold is constructed and aids in understanding the manufacturing process. FIG. 18 is a somewhat schematic view, showing how module 22 looks when contained within mated mold comprising two pieces, called halves, 140, 160. The mold is shown laid on its side, compared to its use position, which would be with its length vertical. Not shown are that the mold will have an opening at one end, for insertion of a parison, nor how air or steam are introduced into the mold. Those and other familiar features known in making molds for blow molding will be inferred, as they are within the ordinary skill.

Figure 19:
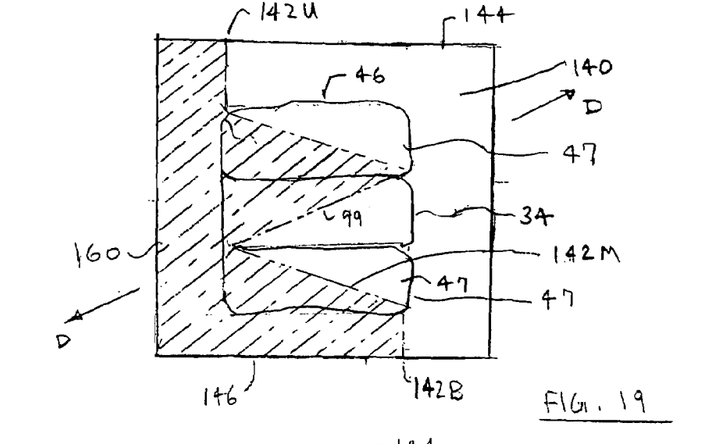
FIG. 19 is a vertical elevation view of the module and die assembly of FIG. 18, toward a first end.
Figure 20:
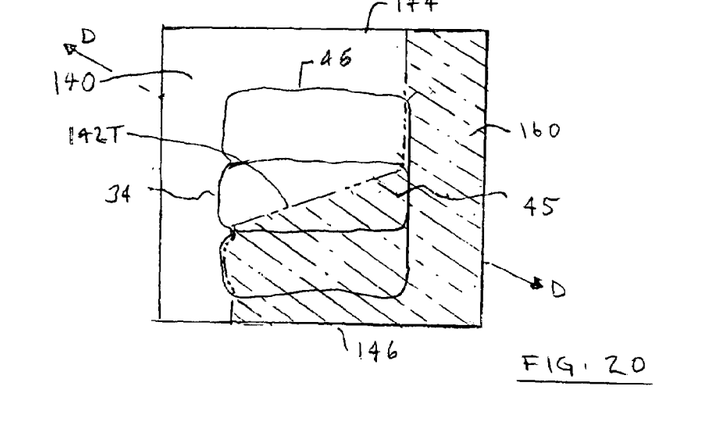
FIG. 20 is like FIG. 19, looking in the opposing direction toward the second end.
Figure 21:
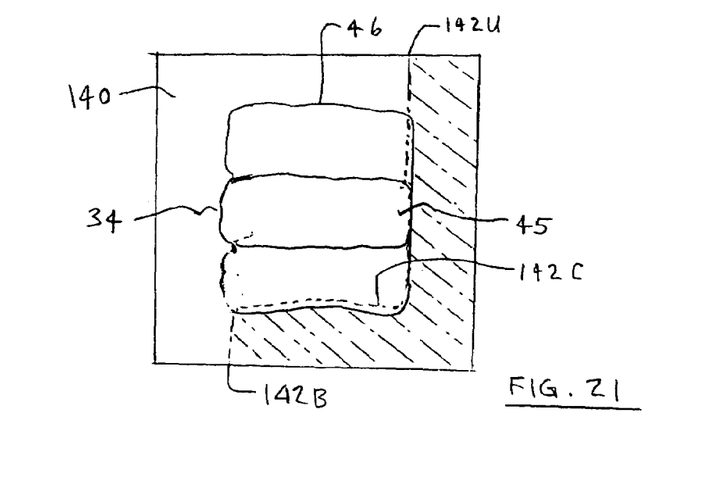
FIG. 21 is like FIG. 19, showing the nominal vertical centerplane of the assembly

FIGS. 19–21 are lengthwise direction views of the mold and module assembly, represented in FIG. 18, respectively showing views looking toward the tenon end, toward the slot mortise end, and at the nominal vertical centerplane. The FIGS. 19–21 have superimposed on them dashed lines, to aid the viewer in distinguishing one mold half from the other. The draw plane, or direction in which the mold halves are drawn apart, is nominally indicated by sloped double arrowhead line D—D.

As shown in the Figures, the mated mold assembly has a top surface 144 and a bottom surface 146. The halves divide along a parting line 142, which has suffices according to where it is running, whether at the tenon end (T), the mortise end (M), the bottom (B), the top (U), or the centerplane (C). As illustrated, the parting line portion 142B runs lengthwise along the bottom of the mold and along the bottom edge of the front 34 of the module. The line portion 142U runs along the rear edge of the top 46 of the module.

The parting lines 142T and 142M at the very ends run diagonally down along different paths, to accommodate to the different requirements of the male and female ends of the module, and to achieve the desired textured look in the finished product. Line 142T runs along a simple zig-zag or Z shape path. See FIG. 20. The path of line 142M has the shape of a winged "N", turned on its side in FIG. 19. Note how the draw of the mold is nominally along the leg segment 99 of parting line 142M. The parting line 142 at the nominal center of the mold runs in a nominal L shape. See FIG. 21.

Thus, it will be apparent from study of these figures how drawing the molds achieves the multiple objectives of forming the opposing ends and the good texture of the front and top. The flashing which forms at the bottom front and top rear, by the parting lines 142B and 142U respectively, can be removed with minimum effect on the normal presentation of the top and front of the module, since in use the lower front parting line will tend to be "in shadow", and the top rear parting line will visually blend with the rear edge of the simulated stone.

The principles just described will be applied to the manufacture of the module of FIGS. 17A and 17B. However, the parting lines at both ends may be made in accord with FIG. 20 or 21, since the problems presented by the slot tenon end fabrication are not present.

The modules of the invention achieve the objects set forth above, including that they are suited to economic mass production; that they are light in weight, so they can be readily shipped and assembled; that they are durable; and that they can be assembled in a variety of different configurations, and then disassembled and stored.

Although this invention has been shown and described with respect to a preferred embodiment, it will be understood by those skilled in this art that various changes in form and detail thereof may be made without departing from the spirit and scope of the claimed invention.

I claim:

1. A simulated masonry wall module, comprising:
   a box-like body having a front side, rear side, top, bottom and opposing first and second ends; wherein at least the front side and top side have textured surfaces simulative of masonry;
   the first end and second end of the body having mating shapes, so that the ends of like bodies may be joined each to the other in horizontal interleave fashion, to provide an assembly having a front side which appears essentially as continuous simulative masonry;
   wherein, each said end comprises means for pinning together the modules, which means comprises at least one vertical protuberance embossing at the first end of the module and at least one pocket embossing shaped to receive said protuberance at the second end of the module; wherein, when two like modules are mated end to end, said protuberance embossing and pocket embossing align, to enable a pin to be passed vertically through the embossings, to run from the top to the bottom of the mated modules; and,
   wherein one of said ends comprises a tenon and the other of said ends comprises a clevis, the clevis defining a slot mortise shaped for receiving a tenon of a mating like module; the tenon and slot mortise having substantially equal lengths, so that when two like modules are mated and pinned, the joint formed therebetween resists substantial horizontal rotation of the modules.

2. The module of claim 1 wherein the tenon width is nominally equal to the mortise slot depth, to thereby provide mated modules with joints resisting substantial rotation when the modules run at 90 degree angles.

3. A simulated masonry wall module, comprising:
   a box-like body having a front side, rear side, top, bottom and opposing first and second ends; wherein at least the front side and top side have textured surfaces simulative of masonry;
   wherein the bottom is lightly sculpted to form an approximate mirror image contour of the textured surface of the top of the module, so that when one module is stacked atop another like module, the bottom of the one module mates and lightly interlocks with the top of the other module;
   the first end and second end of the body having mating shapes, so that the ends of like bodies may be joined each to the other in horizontal interleave fashion, to provide an assembly having a front side which appears essentially as continuous simulative masonry;
   wherein, each said end comprises means for pinning together the ends of mated modules, which means comprises at least one vertical hole or embossing in each end; wherein, when two like modules are mated end to end, said holes or embossings co-align, to enable a pin to be passed vertically through the holes or embossings, to run from the top to the bottom of the mated modules; and,
   wherein one of said ends comprises a tenon and the other of said ends comprises a clevis, the clevis defining a slot mortise shaped for receiving a tenon of a mating like module; the tenon and slot mortise having substantially equal lengths, so that when two like modules are mated and pinned, the joint formed therebetween resists substantial horizontal rotation of the modules.

4. The module of claim 3 wherein, when two modules are stacked as a two high layer in mated and interlock fashion, the ends of the modules are vertically aligned.

5. An assembly comprised of a plurality of modules of claim 3, connected end to end and mounted on a plurality of like modules, to form a two-high module simulated masonry wall length.

6. A simulated masonry wall module, comprising:
   a box-like body having a front side, rear side, top, bottom and opposing first and second ends; wherein at least the front side and top side have textured surfaces simulative of masonry; wherein the body is substantially hollow and is made from blow molded polymer, the body having a first parting line flashing location running along the bottom edge of the front side and a second parting line flashing location running along the rear edge of the top;

the first end and second end of the body having mating shapes, so that the ends of like bodies may be joined each to the other in horizontal interleave fashion, to provide an assembly having a front side which appears essentially as continuous simulative masonry;

wherein, each said end comprises means for pinning together the ends of mated modules, which means comprises at least one vertical hole or embossing in each end; wherein, when two like modules are mated end to end, said holes or embossings co-align, to enable a pin to be passed vertically through the holes or embossings, to run from the top to the bottom of the mated modules; and, wherein one of said ends comprises a tenon and the other of said ends comprises a clevis, the clevis defining a slot mortise shaped for receiving a tenon of a mating like module; the tenon and slot mortise having substantially equal lengths, so that when two like modules are mated and pinned, the joint formed therebetween resists substantial horizontal rotation of the modules.

7. The module of claim 6, further comprising at least one hole on the rear side of the module, for providing access to the interior of the hollow module.

8. The module of claim 6, wherein the rear side of the module is substantially open, for providing access to the interior of the hollow module.

9. The module of claim 6, further comprising a flange, extending laterally from the rear side of the module.

10. The module of claim 6 further comprising a plurality of nubs on the rear side; the nubs having vertical holes for receiving attachments to the module.

11. An assembly comprising at least two modules of claim 6, at least one of said modules having opposing ends lying along a line which is in an off parallel direction relative to the other module.

12. An assembly of modules of claim 6, interconnected end to end, to form an enclosure with front sides of the modules facing outwardly.

13. An assembly comprising:
(a) a plurality of modules of claim interconnected end to end, to form an enclosure with front sides of the modules facing outwardly, wherein each each module comprises:
a box-like body having a front side, rear side, top, bottom and opposing first and second ends; wherein at least the front side and top side have textured surfaces simulative of masonry;
the first end and second end of the body having mating shapes, so that the ends of like bodies may be joined each to the other in horizontal interleave fashion, to provide an assembly having a front side which appears essentially as continuous simulative masonry;
wherein, each said end comprises means for pinning together the ends of mated modules, which means comprises at least one vertical hole or embossing in each end; wherein, when two like modules are mated end to end, said holes or embossings co-align, to enable a pin to be passed vertically through the holes or embossings, to run from the top to the bottom of the mated modules; and,
wherein the first end is a male part comprising a single lateral tenon and the second end is a female part comprising a clevis comprised of two spaced apart portions defining a slot mortise therebetween; wherein, the tenon and slot mortise have substantially equal lengths, so that when the tenon and clevis ends of two like modules are mated and pinned to form a joint therebetween, the joint resists substantial horizontal rotation;
wherein at least one module further comprises a depression running lengthwise along the upper portion of the rear side of the module; and,
(b) a tub shaped liner positioned within the enclosure, for containing liquid or soil, the liner comprising an upward extending circumscribing wall resting against the rear sides of the modules of the enclosure; and,
(c) means for fastening a portion of said upward extending liner wall within said depression.

14. The assembly of claim 13 where wherein said means for fastening is an adhesive strip.

15. A kit comprising:
(a) simulated masonry wall module having
a box-like body having a front side, rear side, top, bottom and opposing first and second ends; wherein at least the front side and top side have textured surfaces simulative of masonry;
the first end and second end of the body having mating shapes, so that the ends of like bodies may be joined each to the other in horizontal interleave fashion, to provide an assembly having a front side which appears essentially as continuous simulative masonry;
wherein, each said end comprises means for pinning together the ends of mated modules, which means comprises at least one vertical hole or embossing in each end; wherein, when two like modules are mated end to end, said holes or embossings co-align, to enable a pin to be passed vertically through the holes or embossings, to run from the top to the bottom of the mated modules; and,
wherein the first end is a male part comprising a single lateral tenon and the second end is a female part comprising a clevis comprised of two spaced apart portions defining a slot mortise therebetween; wherein, the tenon and slot mortise have substantially equal lengths, so that when the tenon and clevis ends of two like modules are mated and pinned to form a joint therebetween, the joint resists substantial horizontal rotation; and,
(b) one or more filler blocks, for mating with an end of the module to form an assembly therewith, the end of which assembly runs in an essentially vertical plane.

16. A module made of a non-masonry material, which module simulates in appearance a masonry structure, comprising:
a box-like body having a front side, rear side, top, bottom and opposing first and second ends; wherein at least the front side has textured surfaces simulative of masonry;
the first end and second end of the body having mating shapes, so that like bodies may be joined each to the other in interleave fashion, to form an assembly having a front side which appears essentially as continuous simulative masonry;
means for pinning together said ends, so a modules may be connected to a second like module; which means comprises at least one vertical hole or embossing in each end; wherein, when two like modules are mated end to end, said holes or embossings co-align, to enable a pin to be passed vertically through the holes or embossings, to run from the top to the bottom of the mated modules;

wherein one of said ends comprises a tenon and the other of said ends comprises a clevis, the clevis defining a slot mortise shaped for receiving a tenon of a mating like module, the tenon and slot mortise having substantially equal lengths, so that when two like modules are mated and pinned the joint formed therebetween resists substantial horizontal rotation of the modules;

a cap, having a simulated masonry appearance, attached to the top side of the module; and, means for attaching the cap to the top side of the module.

17. The module of claim 16 wherein the means for attaching the cap to the body comprises: a multiplicity of female pockets or holes on the top side of the module; and a multiplicity of mating projections extending downwardly from the underside of the cap.

18. The module of claim 16 wherein the cap extends laterally beyond the nominal vertical plane of the front side or the rear side.

19. A simulated masonry wall module made by blow molding of plastic within a split mold, which process creates a parting line in the module, comprising:

a box-like body having a front side, rear side, top, bottom and opposing first and second ends; wherein at least the front side and top side have textured surfaces simulative of masonry;

wherein, the first end of the body comprises a slot mortise and the second end of the body comprises a tenon, wherein the tenon and slot mortise fit together with insubstantial spacing when like modules are mated, so that the ends of like bodies may be joined each to the other in horizontal interleave fashion, to provide an assembly having either a front side or a 90 degree angle corner which appears essentially as continuous simulative masonry;

wherein, each said end comprises means for pinning together the ends of mated modules;

wherein, the module has at least two lengthwise parting lines;

wherein, said front and side are free of parting lines, other than one parting line running lengthwise along the bottom edge of the front of the module and one parting line running lengthwise along the rear edge of the top of the module.

20. The module of claim 19 characterized by a zig-zag shape parting line on the tenon end, and a winged-N shape parting line on the mortise end.

21. The module of claim 19 characterized by a textured bottom which is free of lengthwise parting lines, wherein the texture of the bottom fits the major texture features of the top of a like module.

22. The method of making a simulated masonry wall module made by blow molding of plastic in a split mold, wherein the module comprises a hollow box-like body having a front side, rear side, top, bottom and opposing first and second ends; wherein at least the front side and top side have textured surfaces with substantial undercut, simulative of masonry, and wherein the first end is a male part comprising a single lateral tenon and the second end is a female part comprising a slot mortise, which comprises forming the split mold so that:

(a) said front side of the module formed therein has only two lengthwise parting lines, namely, a first parting line running lengthwise along the bottom edge of the front of the module and a second parting ling running lengthwise along the rear edge of the top of the module; and, (b) the module formed therein has a tenon-end parting line running along a simple zig-zag shape path and a slot mortise-end parting line running along a nominal winged-N shape path, wherein said tenon-end and slot mortise-end parting lines connect the respective ends of said first and second parting lines.

* * * * *